R. J. MILLION.
TRANSMISSION MECHANISM.
APPLICATION FILED MAY 7, 1917.
1,260,239.
Patented Mar. 19, 1918.
2 SHEETS—SHEET 2.
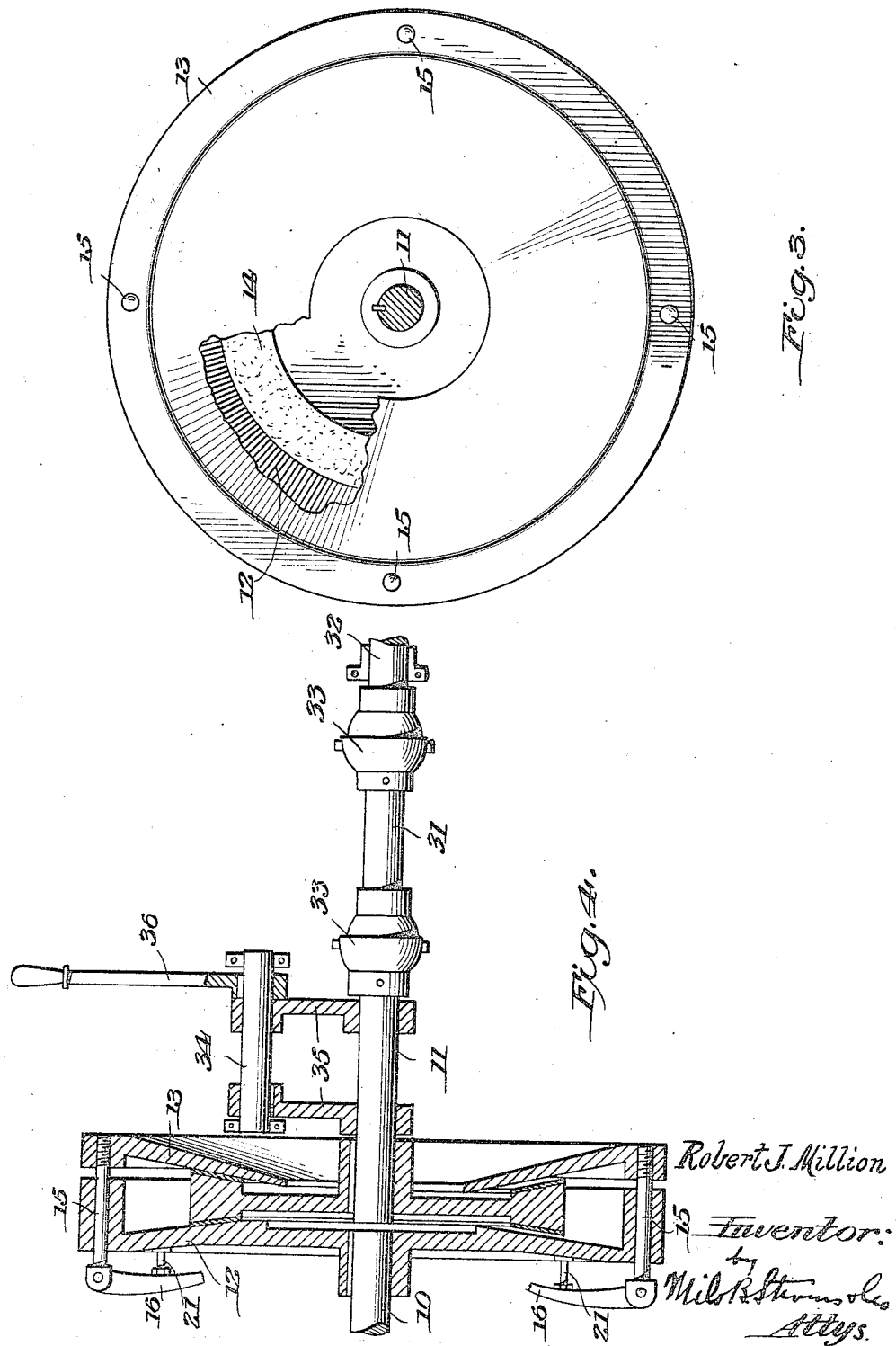

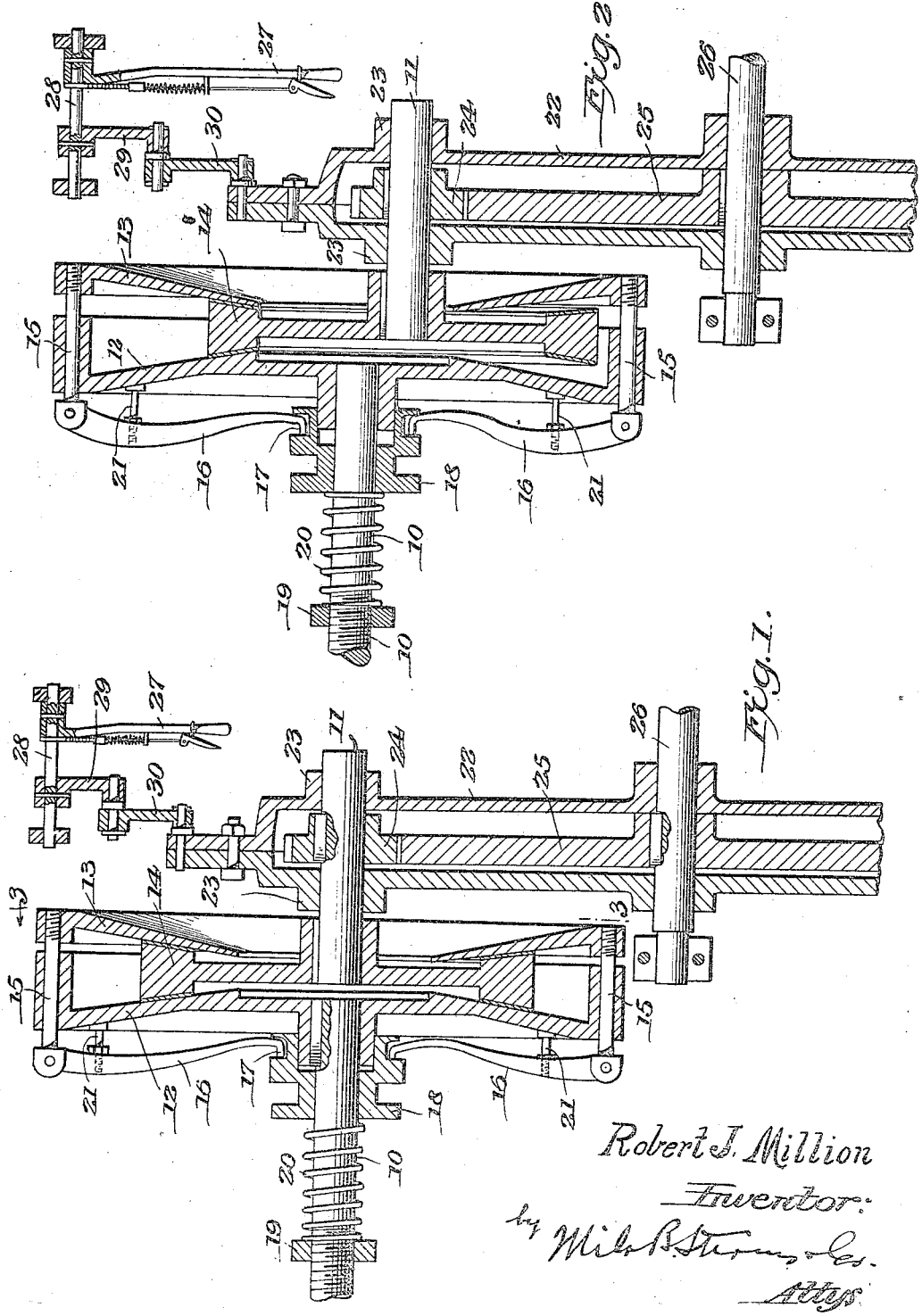

UNITED STATES PATENT OFFICE.

ROBERT J. MILLION, OF MONTICELLO, INDIANA.

TRANSMISSION MECHANISM.

1,260,239.     Specification of Letters Patent.     Patented Mar. 19, 1918.

Application filed May 7, 1917. Serial No. 166,895.

*To all whom it may concern:*

Be it known that I, ROBERT J. MILLION, a citizen of the United States, residing at Monticello, in the county of White and State of Indiana, have invented new and useful Improvements in Transmission Mechanisms, of which the following is a specification.

This invention relates to mechanism for transmitting motion from a drive shaft to a driven shaft or other element, and more particularly a mechanism employing a friction gear.

The invention has for its object to provide a novel and improved friction clutch so constructed and arranged that motion may be transmitted at various speeds.

A further object of the invention is to provide a variable speed clutch which is simple in construction and highly efficient in operation, and which can be easily controlled.

The objects stated are attained by means of a combination and arrangement of parts to be hereinafter described and claimed, and in order that the same may be better understood, reference is had to the accompanying drawings, forming a part of this specification.

In the drawings

Figure 1 is a vertical section of the mechanism;

Fig. 2 is a similar view showing the parts in another position;

Fig. 3 is a cross-section on the line 3—3 of Fig. 1, with parts broken away; and Fig. 4 is a vertical section showing a modification.

Referring specifically to the drawings, 10 denotes a drive shaft driven from any suitable power source. On this shaft is keyed or otherwise made fast one of the members of a friction clutch, the other member of which is on the driven shaft 11. The first mentioned clutch member is a driving plate in the form of a friction disk 12 carrying another driving plate 13. The plates 12 and 13 are spaced from each other, and the clutch member on the driven shaft seats therebetween. This member is a plate or disk 14 which is splined or otherwise so fastened on the shaft 11 that it can move lengthwise thereon. The plate 13 is movable toward and from the plate 12 to grip and frictionally hold the plate 14 therebetween and to release the same. When the plate 14 is clamped by the plates 12 and 13, the motion of the shaft 10 is transmitted to the shaft 11 at the same rate of speed as the former, so that a direct drive is obtained.

The driving plate 12 has transverse apertures near its periphery in which are slidably mounted stud pins 15 to one end of which the plate 13 is fastened. To the other end of the pins are connected the outer ends of levers 16 seating loosely at their inner ends in a peripheral groove 17 of a sleeve 18 slidably mounted on the shaft 10. Between one end of the sleeve 18 and an abutment 19 on the shaft 10 is a spring 20 which normally holds the sleeve advanced to apply the clutch, the forward movement of the sleeve, through the levers 16 and the pins 15 drawing the plate 13 toward the plate 12 to grip the plate 14, and upon retracting the sleeve, the plate 13 is backed away from the plate 12 to release the plate 14. The levers 16 are provided with suitable fulcrum screws 21. Any conventional lever or other mechanism is provided for operating the sleeve 18.

The driven shaft 11, during the direct drive, is in axial alinement with the drive shaft 10 and it is so supported that it may be swung out of alinement with the drive shaft for a purpose to be presently described. The movable support for the shaft 11 is a gear case 22 through which the shaft 11 passes, said case having suitable shaft bearings 23. In the gear case is housed a pinion 24 fast on the shaft 11 and meshing with a gear 25 on a shaft 26, said shaft also being supported by bearings on the case. It will, of course, be understood that the motion of the shaft 11 may be transmitted directly to the part to be driven, in which event the shaft 26 and the gears 24 and 25, transmitting motion to said shaft from the shaft 11, will be dispensed with.

The gear case 22 will be supported in any suitable manner so that it may be swung bodily to bring the shaft 11 into or out of alinement with the shaft 10.

At 27 is shown a lever fixed on a rock shaft 28. On this shaft is also fixed a rocker arm 29 which is connected by a link 30 to the gear case 22. This hand lever and its connections with the gear case are provided for swinging the latter for the purpose hereinbefore described. The hand lever is provided with conventional means for locking the same.

The faces of the driving plates 12 and 13 are beveled so that their opposite friction surfaces converge in the direction of the center of the plates. The opposite friction faces of the driven plate 14 are also beveled at the same angle as the bevel of the friction faces of the driving plates. During the direct drive both faces of the driven plate are in contact throughout their entire surface with the friction faces of the drive plates, but when the shaft 11 is swung to come eccentric or out of alinement with the drive shaft 10, the contact is only with a small portion of the surfaces as shown in Fig. 2, and as this point of contact is nearer the center of the drive plates than during the direct drive, it will be evident that the shaft 11 is driven at a reduced rate of speed. Various speeds can be obtained by shifting the plate 14 to bring it closer to or farther from the center of the plates. The spring 20 yieldingly holds the plates 12 and 13 in driving contact with the plate 14, and when the plate 14 is shifted to obtain a different speed, the plates 12 and 13 automatically spread to permit the movement of the plate 14 toward the center. Upon backing the plate 13 clear of the plate 14, the driving connection between the shafts 10 and 11 is broken.

The mechanism is simple and has but a few parts. The action of the clutch is positive and reliable as the driven plate is rigidly clamped between the two drive plates, and the change from one speed to another can be easily and quickly made. There is no end thrust or excessive strain on the bearings when the mechanism is in action. The driven shaft remains parallel to the drive shaft at all times. The driven plate 14 is splined on the shaft 11 so that it may move lengthwise thereon in order that it may be firmly pressed against the friction face of the plate 12 by the plate 13. It will also be noted that the diameter of the driven plate is less than the diameter of the drive plates to permit the shifting movement of the former with respect to the center of the latter, and for the same reason the friction surface of the driven plate is narrower than the friction surfaces of the drive plates. By the mechanism shown the speed can only be reduced by shifting the driven plate 14, but if this plate is used as the driver and the plates 12 and 13 are driven, the speed may be increased.

The preferred embodiment of the invention has been shown, but it will be understood that various modifications in the structural details illustrated may be made without a departure from the spirit and scope of the invention as claimed hereinafter. Fig. 3 illustrates one modification. Here the driven shaft 11 is connected by a short shaft 31 to a shaft 32, connections between these shafts being made by universal joints 33 of any suitable type. The shaft 11 is not supported by a gear case as in the first instance, but is shifted by an actuating mechanism directly connected to the shaft, this mechanism being a rock shaft 34 connected by a pair of rocker arms 35 to the shaft 11. The rock shaft is actuated by a hand lever 36 as before.

I claim.

1. The combination of a drive and a driven shaft, one of said shafts being movable bodily into and out of axial alinement with the other shaft, means for effecting such movement of the shaft, a pair of spaced friction members carried by one of the shafts, one of said members being movable toward and from the other member, and a friction member on the other shaft and located between the first mentioned friction members and engageable thereby on both sides, the friction surfaces of the first mentioned members being beveled and said surfaces converging toward the center of the members, and the friction surfaces of the other member being beveled to correspond to the bevel of the friction surfaces of the first mentioned members.

2. The combination of a drive and a driven shaft, one of said shafts being movable bodily into and out of axial alinement with the other shaft, means for effecting such movement of the shaft, a pair of spaced friction members carried by one of the shafts, one of said members being held yieldingly pressed toward the other member, and a friction member on the other shaft and located between the first mentioned friction members and engageable thereby on both sides, the friction surfaces of the first mentioned members being beveled and said surfaces converging toward the center of the members, and the friction surfaces of the other member being beveled to correspond to the bevel of the friction surfaces of the first mentioned members.

3. The combination of a drive and a driven shaft, one of said shafts being movable bodily into and out of axial alinement with the other shaft, means for effecting such movement of the shaft, a pair of spaced friction members carried by one of the shafts, one of said members being movable toward and from the other member, and a friction member on the other shaft and located between the first mentioned friction members and engageable thereby on both sides, the friction surfaces of the first mentioned members being beveled and said surfaces converging toward the center of the members, and the friction surfaces of the other member being beveled to correspond to the bevel of the friction surfaces of the first mentioned members, the diameter of the second mentioned friction member and the width of its friction surfaces being less than the diameter of the first mentioned friction members and the width of their friction surfaces.

4. The combination of a drive and a driven shaft, one of said shafts being movable bodily into and out of axial alinement with the other shaft, means for effecting such movement of the shaft, a friction member on one of the shafts, a coöperating friction member spaced from the aforesaid member and movable toward and from the same, slidable pins carried by the first mentioned member and carrying the second mentioned member, actuating levers connected to the pins, a collar slidable on the aforesaid shaft and having an actuating connection with the levers, a spring urging the collar in one direction, and a friction member on the other shaft and located between the first mentioned friction members and engageable thereby on both sides.

5. The combination of a drive and a driven shaft, one of said shafts being movable bodily into and out of axial alinement with the other shaft, means for effecting such movement of the shaft, a pair of spaced friction members carried by one of the shafts, one of said members being movable toward and from the other member, and a friction member on the other shaft and located between the first-mentioned friction members and engageable thereby on both sides, said last-mentioned friction member being slidable on and connected to its shaft to transmit motion thereto, the friction surfaces of the first-mentioned members being beveled and said surfaces converging toward the center of the members, and the friction surfaces of the other member being beveled to correspond to the bevel of the friction surfaces of the first-mentioned members.

In testimony whereof I affix my signature.

ROBERT J. MILLION.

Copies of this patent may be obtained for five cents each, by addressing the "Commissioner of Patents, Washington, D. C."